United States Patent
Faraone et al.

(10) Patent No.: US 12,170,538 B2
(45) Date of Patent: Dec. 17, 2024

(54) RADIO FREQUENCY ARCHITECTURE FOR REDUCING MUTUAL INTERFERENCE BETWEEN MULTIPLE WIRELESS COMMUNICATION MODALITIES

(71) Applicant: MOTOROLA SOLUTIONS, INC., Chicago, IL (US)

(72) Inventors: Antonio Faraone, Fort Lauderdale, FL (US); Giorgi Bit-Babik, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 814 days.

(21) Appl. No.: 16/917,452

(22) Filed: Jun. 30, 2020

(65) Prior Publication Data

US 2021/0409064 A1    Dec. 30, 2021

(51) Int. Cl.
  *H04B 1/48*    (2006.01)
  *H01Q 1/24*    (2006.01)
  (Continued)

(52) U.S. Cl.
  CPC .............. *H04B 1/525* (2013.01); *H01Q 1/243* (2013.01); *H04B 1/0458* (2013.01); *H04B 1/48* (2013.01)

(58) Field of Classification Search
  CPC ........ H04B 1/525; H04B 1/0458; H04B 1/48; H01Q 1/243; H01Q 1/521
  See application file for complete search history.

(56) References Cited

U.S. PATENT DOCUMENTS 5,861,844 A * 1/1999 Gilmore ................... H01Q 3/24
                                                   455/423
5,914,693 A * 6/1999 Takei ....................... H01Q 13/18
                                                   343/771
(Continued)

FOREIGN PATENT DOCUMENTS

CN    110829023 A  *  2/2020   ............... H01Q 1/36
CN    110855334 B  * 10/2021   ........... H04B 1/1081
(Continued)

OTHER PUBLICATIONS

Jasteh, Donya: "Isolation Enhancement in a Dual Port Antenna," A thesis submitted to the University of Birmingham for the degree of Master of Philosophy, School of Electronic, Electrical and Computer Engineering, The University of Birmingham, Oct. 2011, all pages.
(Continued)

*Primary Examiner* — Hai V Tran
*Assistant Examiner* — Bamidele A Immanuel
(74) *Attorney, Agent, or Firm* — Michael Best & Friedrich LLP

(57) ABSTRACT

Radio frequency architecture for reducing mutual interference between multiple wireless communication modalities. One embodiment provides a portable communications device including a housing and an RF antenna system including a first RF antenna, a second RF antenna, and a third RF antenna in the housing. The portable communications device includes an RF transceiver system including a first RF transceiver, a second RF transceiver, and a third RF transceiver operating in respective bands and an isolator circuit coupled to the RF antenna system and the RF transceiver system and configured to provide RF isolation between the first RF transceiver, the second RF transceiver, and the third RF transceiver. The isolator circuit includes an RF coupler featuring six RF coupler ports coupled to the first
(Continued)

RF antenna, the second RF antenna, the third RF antenna, the first RF transceiver, the second RF transceiver, and the third RF transceiver through respective phasor shaping networks.

16 Claims, 11 Drawing Sheets

(51) Int. Cl.
*H04B 1/04* (2006.01)
*H04B 1/525* (2015.01)

(56) References Cited

U.S. PATENT DOCUMENTS

| | | | |
|---|---|---|---|
| 7,102,577 B2* | 9/2006 | Richard | H01Q 9/30 343/702 |
| 7,982,683 B2* | 7/2011 | Peyla | H04B 7/0805 343/860 |
| 8,055,216 B2* | 11/2011 | Dent | H04B 17/14 455/114.2 |
| 8,154,460 B2* | 4/2012 | Sakata | H01Q 1/243 343/702 |
| 8,441,964 B2* | 5/2013 | Wu | H01Q 21/08 333/101 |
| 8,761,694 B2* | 6/2014 | Lorenz | H04B 1/0483 455/127.2 |
| 8,830,131 B1 | 9/2014 | Doane et al. | |
| 8,912,957 B2* | 12/2014 | Lin | H01Q 3/30 342/368 |
| 9,161,386 B1 | 10/2015 | Beghini et al. | |
| 9,461,365 B2* | 10/2016 | Iellici | H01Q 1/48 |
| 9,496,913 B2 | 11/2016 | King et al. | |
| 9,641,205 B1* | 5/2017 | Hyun | H04B 1/0475 |
| 9,819,077 B1* | 11/2017 | Desclos | H01Q 21/30 |
| 9,936,360 B1* | 4/2018 | Schuler | H04W 4/38 |
| 10,873,348 B2* | 12/2020 | Faraone | H04B 1/0064 |
| 11,139,568 B2* | 10/2021 | Olesen | H01Q 5/378 |
| 2004/0125016 A1* | 7/2004 | Atwood | H01Q 7/00 343/866 |
| 2004/0125018 A1* | 7/2004 | Ramasamy | H01Q 1/38 343/866 |
| 2004/0131038 A1* | 7/2004 | Kim | H04B 7/0634 370/332 |
| 2004/0160374 A1* | 8/2004 | Johansson | H01Q 21/28 343/757 |
| 2006/0114158 A1* | 6/2006 | Chiang | H04B 7/086 342/424 |
| 2008/0075058 A1* | 3/2008 | Mundarath | H04B 7/0417 370/342 |
| 2009/0153417 A1* | 6/2009 | Chen | H01Q 1/241 343/702 |
| 2009/0318092 A1* | 12/2009 | Maoz | H01Q 21/28 455/73 |
| 2010/0109967 A1* | 5/2010 | Ranta | H01Q 1/243 343/853 |
| 2010/0157858 A1* | 6/2010 | Lee | H04B 1/0057 343/904 |
| 2010/0225543 A1* | 9/2010 | Kakitsu | H04B 7/0805 343/702 |
| 2010/0248651 A1* | 9/2010 | Dent | H04B 17/14 455/101 |
| 2011/0260933 A1* | 10/2011 | Takahashi | H01Q 1/243 343/702 |
| 2013/0109449 A1* | 5/2013 | Desclos | H01Q 1/243 455/575.7 |
| 2013/0170530 A1 | 7/2013 | Yoshikawa et al. | |
| 2013/0273859 A1* | 10/2013 | King | H04B 1/44 455/78 |
| 2014/0152523 A1* | 6/2014 | Wu | H01Q 1/523 343/841 |
| 2014/0159971 A1* | 6/2014 | Hall | H01Q 5/335 343/745 |
| 2014/0266866 A1* | 9/2014 | Swirhun | G01S 7/026 342/188 |
| 2015/0065046 A1* | 3/2015 | Wilfred | H04W 12/50 455/41.2 |
| 2015/0070241 A1* | 3/2015 | Howard | H01Q 3/26 343/853 |
| 2015/0117325 A1* | 4/2015 | Ponnuswamy | H04L 5/0048 370/329 |
| 2015/0188215 A1 | 7/2015 | Jarvis | |
| 2015/0222310 A1* | 8/2015 | Janani | H04B 1/126 375/349 |
| 2015/0263420 A1* | 9/2015 | Wu | H01Q 1/523 343/852 |
| 2015/0340769 A1* | 11/2015 | Desclos | H01Q 21/30 343/745 |
| 2015/0349808 A1* | 12/2015 | Wu | H04B 1/0057 455/84 |
| 2016/0285501 A1* | 9/2016 | Jeong | H04B 1/0057 |
| 2017/0063425 A1 | 3/2017 | Khlat et al. | |
| 2017/0064773 A1 | 3/2017 | Anderson et al. | |
| 2017/0155431 A1* | 6/2017 | Klemes | H04B 7/0617 |
| 2018/0102805 A1* | 4/2018 | Ukon | H04B 1/525 |
| 2018/0198537 A1* | 7/2018 | Rexberg | H04B 17/14 |
| 2019/0051981 A1* | 2/2019 | Hannula | H04B 7/0404 |
| 2019/0058263 A1* | 2/2019 | Oh | H01Q 1/243 |
| 2019/0074601 A1* | 3/2019 | Kim | H01Q 9/04 |
| 2019/0181550 A1* | 6/2019 | Chen | H03F 3/24 |
| 2019/0334228 A1 | 10/2019 | Haridas et al. | |
| 2020/0021025 A1* | 1/2020 | Gomez Angulo | H01Q 1/243 |
| 2020/0021038 A1* | 1/2020 | Lee | H01Q 25/002 |
| 2020/0176893 A1* | 6/2020 | Roe | H01Q 9/42 |
| 2020/0195280 A1* | 6/2020 | Burra | H04B 1/48 |
| 2021/0273663 A1* | 9/2021 | Bit-Babik | H04B 1/0057 |
| 2021/0281281 A1* | 9/2021 | Xu | H04B 7/04 |

FOREIGN PATENT DOCUMENTS

| | | | | |
|---|---|---|---|---|
| CN | 110752439 B | * | 11/2021 | H01Q 1/36 |
| CN | 110797642 B | * | 11/2021 | H01Q 1/36 |
| CN | 110829023 B | * | 11/2021 | H01Q 1/36 |
| CN | 110829025 B | * | 11/2021 | H01Q 1/22 |
| CN | 111478044 B | * | 3/2022 | H01Q 1/50 |
| CN | 113556138 B | * | 2/2023 | H04B 1/04 |
| EP | 1976131 A1 | | 10/2008 | |
| WO | 2005060043 A2 | | 6/2005 | |
| WO | 2010108772 A1 | | 9/2010 | |
| WO | 2019005415 A1 | | 1/2019 | |

OTHER PUBLICATIONS

Mahmood, Faraz et al.: "Decoupling Techniques of Compact and Broadband MIMO Antennas for Handheld Devices," 2012 6th European Conference on Antennas and Propagation (EUCAP), Mar. 26-30, 2012, all pages.

* cited by examiner

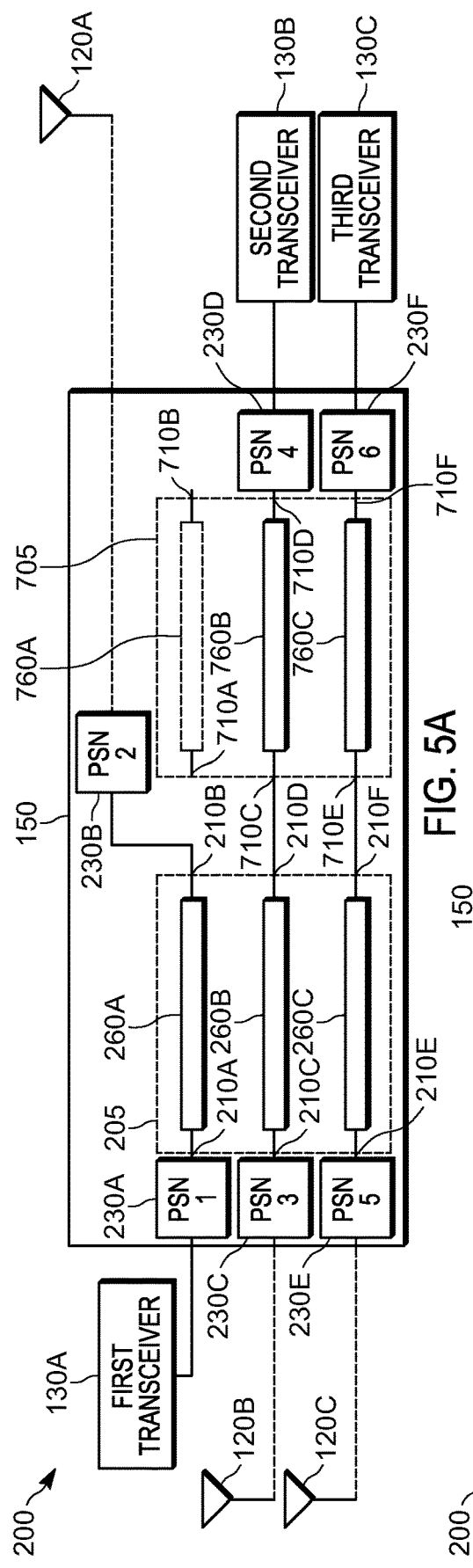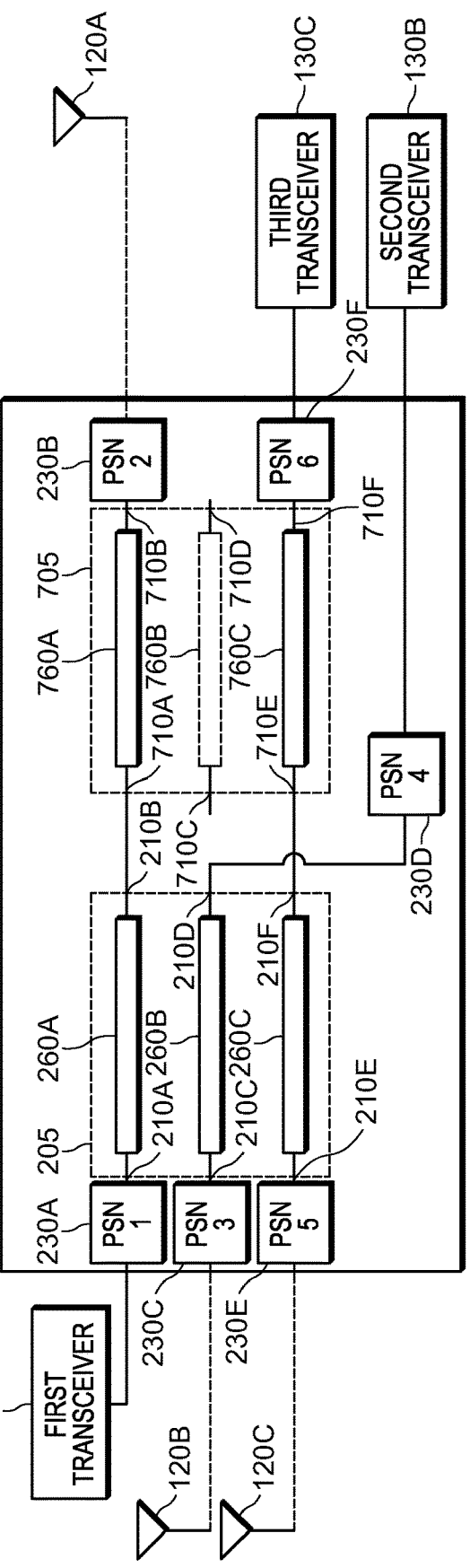

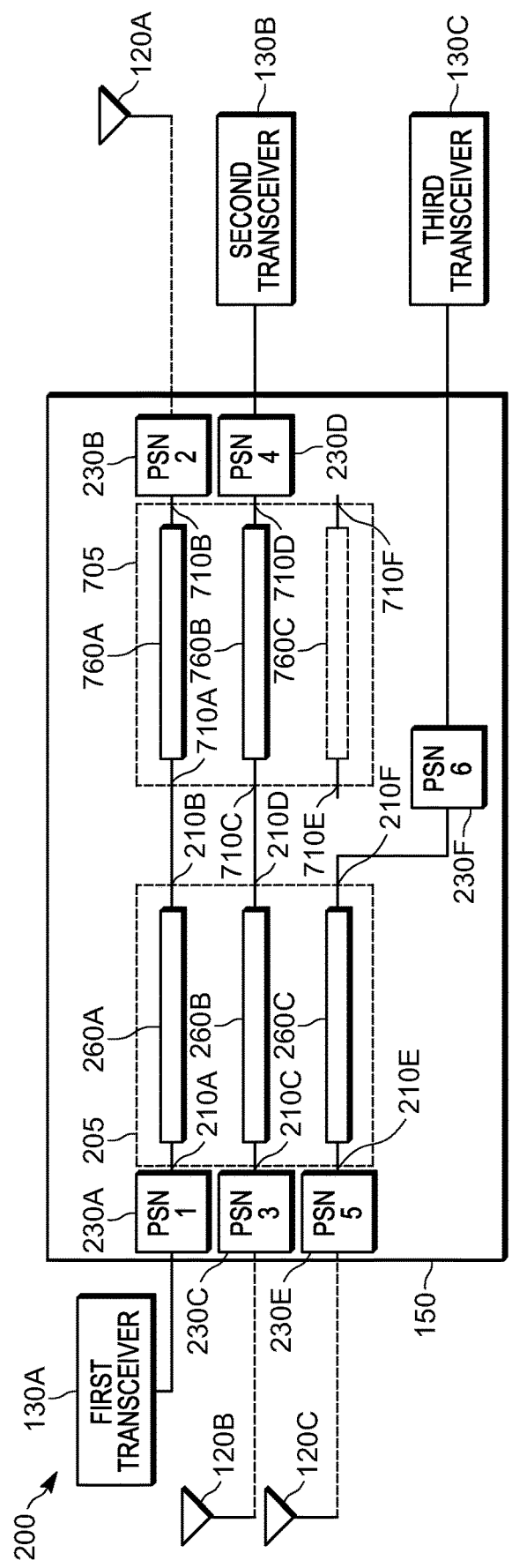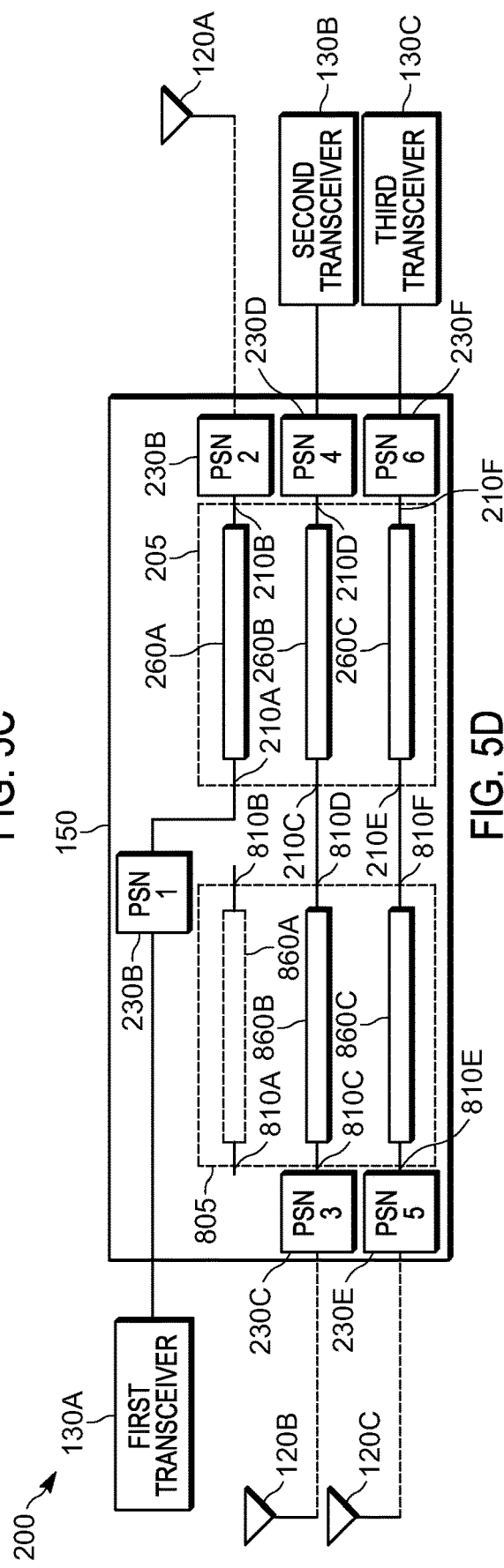

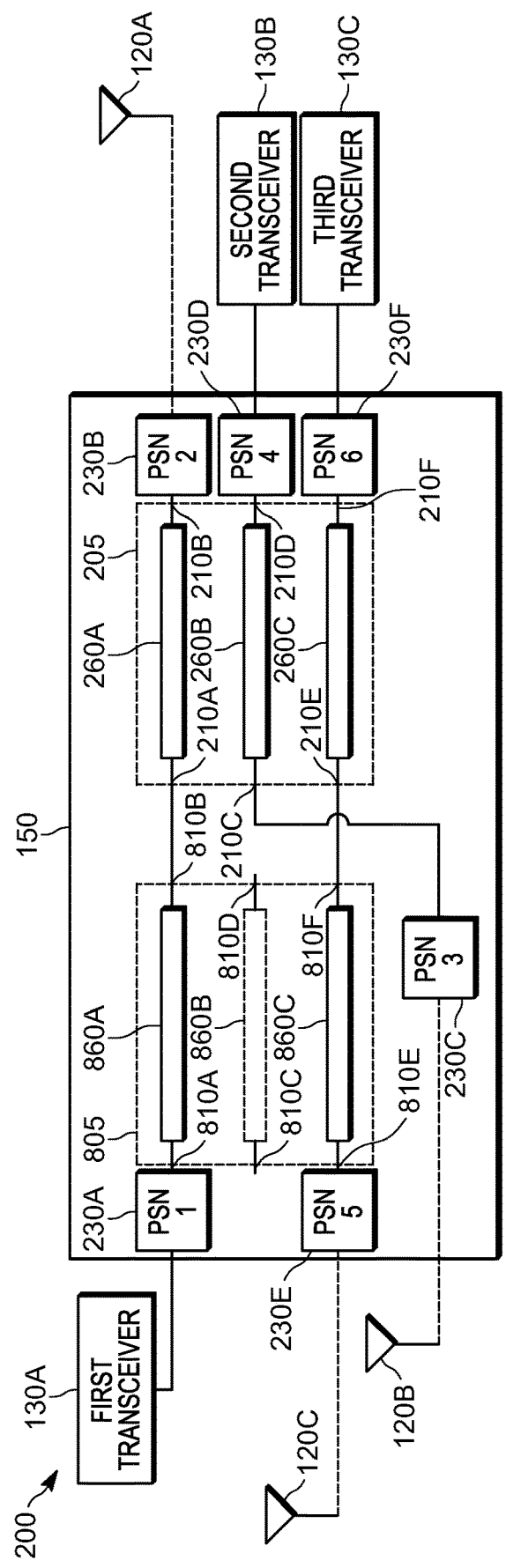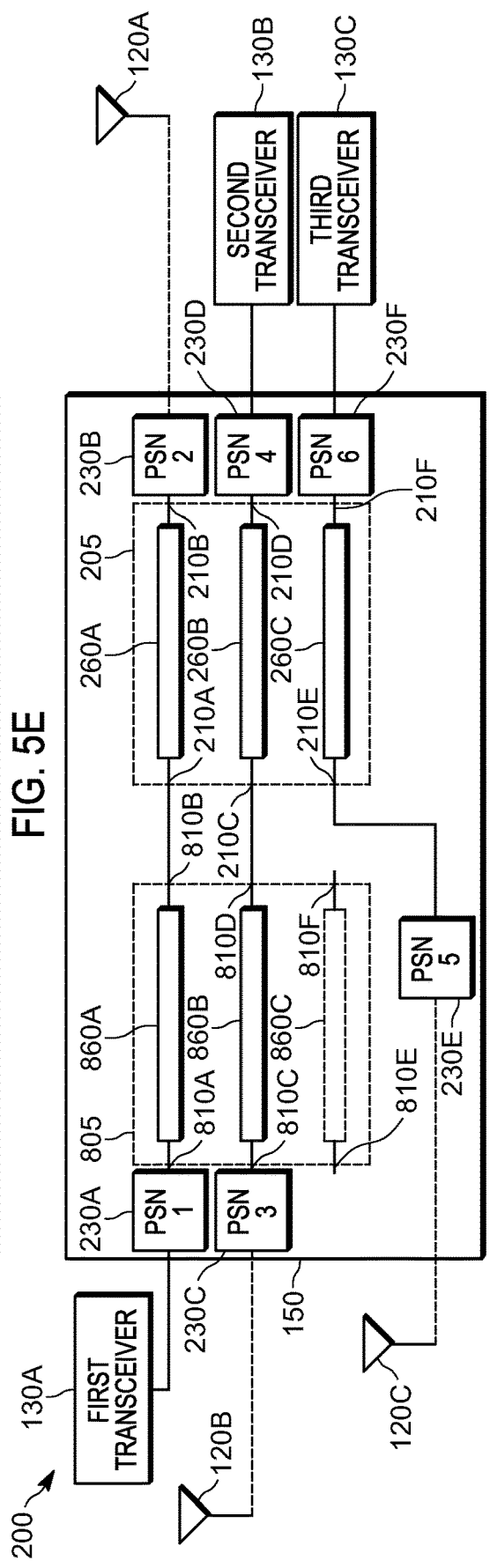
FIG. 5E
FIG. 5F

RADIO FREQUENCY ARCHITECTURE FOR REDUCING MUTUAL INTERFERENCE BETWEEN MULTIPLE WIRELESS COMMUNICATION MODALITIES

BACKGROUND OF THE INVENTION

Portable wireless communications devices operated by public safety organizations (for example, police departments, fire departments, and the like) sometimes operate over multiple communication modalities or systems. For example, portable two-way radios or smart telephones issued to public safety officers may simultaneously operate over a land mobile radio (LMR) wireless communication system and a long-term evolution (LTE) wireless communication system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 5A-5G are block diagrams of sets of wireless communication components of the portable communications device of FIG. 1 in accordance with some embodiments.

Figure 1:
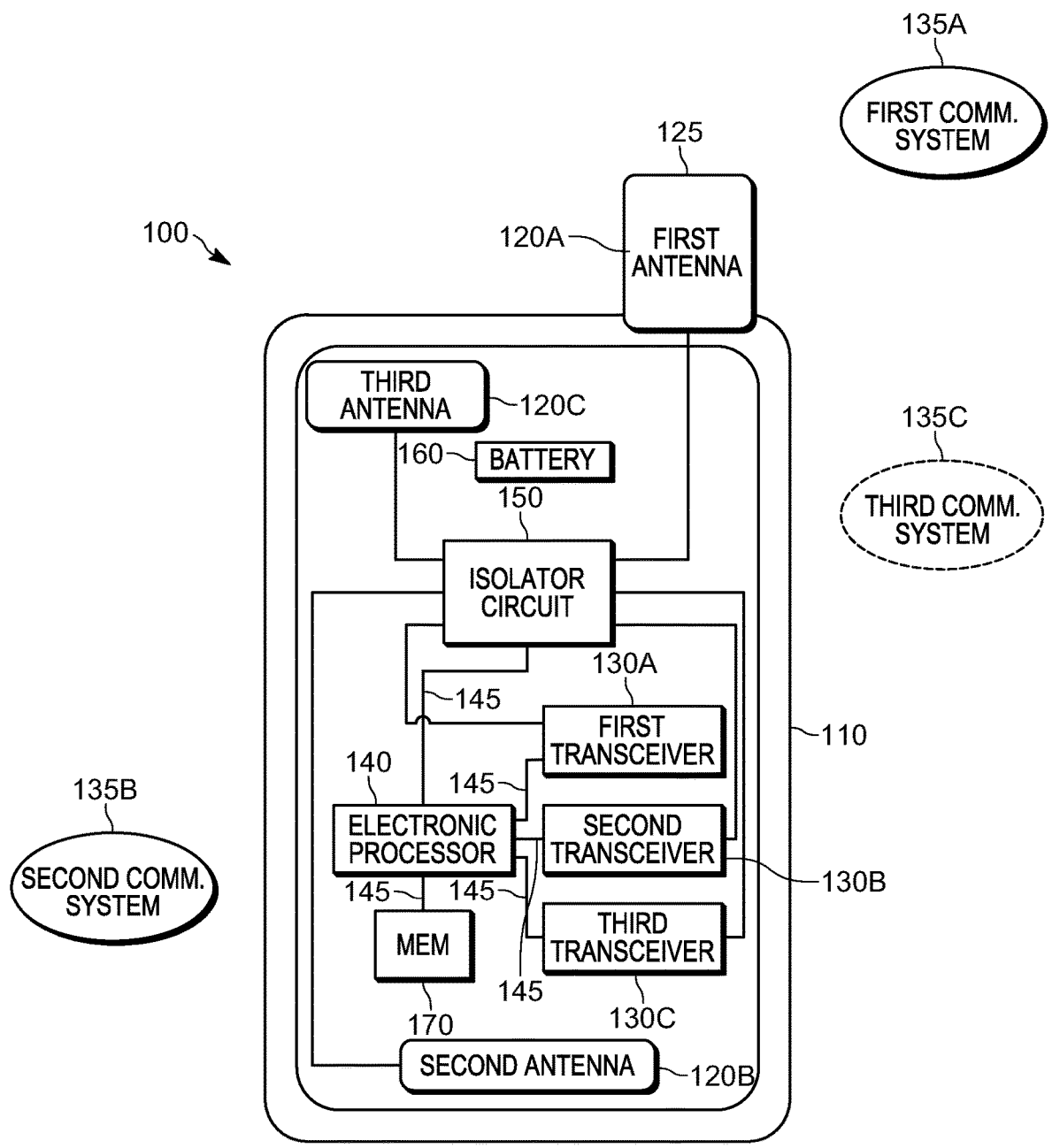
FIG. 1 schematically illustrates a portable communications device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, portable two-way radios or smart telephones may be configured to operate over both a land mobile radio (LMR) wireless communication system and a long-term evolution (LTE) wireless communication system. Each communication system may operate in one or more preconfigured frequency bands. For example, an LMR system sometimes operates in one or more of a 7/800 Megahertz (MHz) band (760-870 MHz), a very high frequency (VHF) band (136-174 MHz), and an ultra high frequency (UHF) band (380-520 MHz). An LTE system typically operates in one of three bands: a 699-960 MHz band (referred to as the low-band (LB)), a 1710-2200 MHz band (referred to as the mid-band (MB)), and a 2500-2690 MHz band (referred to as the high-band (HB)). The mid-band and the high-band may be collectively referred to as the mid-high band (MHB). The portable communications devices may use separate radio frequency (RF) transceivers and associated antennas, for each communication system. The transceivers operating in overlapping frequency bands and/or non-overlapping frequency bands may interfere with each other due to substantial RF coupling between the respective antennas since they are proximate to each other within the same device, sharing the device metallic structures which may act as their respective electrical counterpoise. This RF interference may decrease the communication quality of the portable communications devices. RF interference may also cause the devices to operate in a manner that exceeds regulatory limits on spurious RF emissions.

To operate within the LTE system, portable communications devices may also use separate transceivers and antennas. For example, the portable communications devices include a main LTE transceiver and a diversity LTE transceiver. These main and diversity LTE transceivers are provided in addition to the LMR transceiver. There is no current solution for concurrent RF isolation between the LMR transceiver and the main LTE transceiver, between the LMR transceiver and the diversity LTE transceiver, and between the main and diversity LTE transceivers.

Accordingly, there is a need for reducing mutual RF interference between three different communication systems within a wireless communications device.

One embodiment provides a portable communications device including a housing and a radio-frequency (RF) antenna system including a first RF antenna, a second RF antenna, and a third RF antenna supported by the housing. The portable communications device also includes an RF transceiver system including a first RF transceiver, a second RF transceiver, and a third RF transceiver operating in respective RF bands, and an isolator circuit coupled to the RF antenna system and the RF transceiver system and configured to provide RF isolation between the first RF transceiver, the second RF transceiver, and the third RF transceiver. The isolator circuit includes an RF coupler featuring six RF coupler ports coupled to the first RF antenna, the second RF antenna, the third RF antenna, the first RF transceiver, the second RF transceiver, and the third RF transceiver through respective phasor shaping networks.

Another embodiment provides a wireless communication component set for a portable communications device. The component set includes a radio-frequency (RF) antenna system including a first RF antenna, a second RF antenna, and a third RF antenna configured to be supported on a housing of the portable communications device and an RF transceiver system including a first RF transceiver, a second RF transceiver, and a third RF transceiver operating in respective RF bands. The component set also includes an isolator circuit coupled to the RF antenna system and the RF transceiver system and configured to provide RF isolation between the first RF transceiver, the second RF transceiver, and the third RF transceiver. The isolator circuit includes an RF coupler featuring six RF coupler ports coupled to the first RF antenna, the second RF antenna, the third RF antenna, the first RF transceiver, the second RF transceiver, and the third RF transceiver through respective phasor shaping networks.

FIG. 1 illustrates a portable communications device 100 having a wireless communication component set formed according to one example embodiment. The portable communications device 100 includes a housing 110, an RF antenna system 120 including: a first RF antenna 120A; a second RF antenna 120B; and a third RF antenna 120C. The portable communications device 100 also includes an RF transceiver system 130 having: a first RF transceiver 130A; a second RF transceiver 130B; and a third RF transceiver 130C, an electronic processor 140, an isolator circuit 150, and a battery 160. The portable communications device 100 may include more or fewer components than those illustrated in FIG. 1 and may perform functions other than those described herein. The portable communications device 100 is, for example, a mobile two-way radio, a portable two-way radio, a smart telephone, a smart wearable device (for example, a smart watch), a tablet computer, and the like.

The battery 160 provides operating power to the electrical components of the portable communications device 100. The battery 160 may be a battery pack or one or more battery cells provided in a battery compartment. In some embodiments, the portable communications device 100 may be powered by other power sources in addition to or in place of the battery 160.

The electronic processor 140 is coupled to the first RF transceiver 130A, the second RF transceiver 130B, the third RF transceiver 130C, and the isolator circuit 150 over control and/or data buses 145. The electronic processor 140 provides controls and other signals over the control and/or data buses 145 to the first RF transceiver 130A, the second RF transceiver 130B, the third RF transceiver 130C, and the isolator circuit 150 as further provided below. In some embodiments, the electronic processor 140 is implemented as a microprocessor with separate memory, for example, a memory 170. In other embodiments, the electronic processor 140 is implemented as a microcontroller or digital signal processor (with memory 170 on the same chip). In other embodiments, the electronic processor 140 is implemented using multiple electronic processors. In addition, the electronic processor 140 may be implemented partially or entirely as, for example, a field programmable gate array (FPGA), an application specific integrated circuit (ASIC), and the like and the memory 170 may not be needed or be modified accordingly. In the example illustrated, the memory 170 includes non-transitory, computer readable memory that stores instructions that are received and executed by the electronic processor 140 to carry out the functionality of the portable communications device 100. The memory 170 may include, for example, a program storage area and a data storage area. The program storage area and the data storage area may include combinations of different types of memory, for example, read-only memory and random-access memory.

The first RF transceiver 130A, via the first RF antenna 120A, the second RF antenna 120B, and the third RF antenna 120C, enables communication between the portable communications device 100 and other portable communications devices 100, other wireless communication devices supporting a subset of the communication modalities of the portable communications device 100, application servers, call controllers, command centers, and the like over a first wireless communication system 135A. In one example, the first wireless communication system 135A is an LMR system operating in the 7/800 MHz band and the first RF transceiver 130A is an LMR transceiver configured to operate over a first range of frequencies or RF bands (for example, 760-870 MHz). The first RF transceiver 130A may also operate over other frequency ranges or RF bands (for example, a UHF band, a VHF band, and the like). In some embodiments, the first RF transceiver 130A may include separate transmitting and receiving components, for example, a first transmitter and a first receiver.

The second RF transceiver 130B, via the first RF antenna 120A, the second RF antenna 120B, and the third RF antenna 120C, enables communication between the portable communications device 100 and other portable communications devices 100, other wireless communication devices supporting a subset of the communication modalities of the portable communications device 100, an application server, a call controller, command centers, and the like over a second wireless communication system 135B. In one example, the second wireless communication system 135B is an LTE system that may be selectively and/or concurrently operated in the low-band (LB), the mid-band (MB), and/or the high-band (HB). The second RF transceiver 130B is a main LTE transceiver configured to operate over a second range of frequencies or RF bands (for example, LB frequencies) and a third range of frequencies or RF bands (for example, MB frequencies and/or HB frequencies). In some embodiments, the second RF transceiver 130B includes separate transmitting and receiving components, for example, a second transmitter and a second receiver.

The third RF transceiver 130C, via the first RF antenna 120A, the second RF antenna 120B, and the third RF antenna 120C, and along with the second RF transceiver 130B enables communication between the portable communications device 100 and other portable communications devices 100, other wireless communication devices supporting a subset of the communication modalities of the portable communications device 100, an application server, a call controller, command centers, and the like over the second wireless communication system 135B. In one example, the third RF transceiver 130C is a diversity LTE transceiver and is configured to operate over the second range of frequencies or RF bands (for example, LB frequencies) and the third range of frequencies or RF bands (for example, MB frequencies and/or HB frequencies). In some embodiments, the third RF transceiver 130C includes separate transmitting and receiving components, for example, a third transmitter and a third receiver. In some embodiments, the third RF transceiver 130C may only include receiving components, for example, the third receiver.

Alternatively, the third RF transceiver 130C, via the first RF antenna 120A, the second RF antenna 120B, and the third RF antenna 120C enables communication between the portable communications device 100 and other portable communications devices 100, other wireless communication devices supporting a subset of the communication modalities of the portable communications device 100, an application server, a call controller, command centers, and the like over a third wireless communication system 135C. The below description is provided with respect to the first wireless communication system 135A and the second wireless communication system 135B. However, the disclosure is equally application to the first wireless communication system 135A, the second wireless communication system 135B, and the third wireless communication system 135C.

The first RF antenna 120A may be located at the top of the portable communications device 100 in an antenna housing 125 that extends upward from the housing 110 of the portable communications device 100. The first RF antenna 120A is, for example, a monopole antenna typically configured to be an LMR antenna. However, due to the advantages of the present system (for example, the six-port isolator circuit 150), the first RF antenna 120A may be used for communication in both the first communication system 135A and the second communication system 135B. The second RF antenna 120B may be located internal to, for example, at the bottom of the portable communications device 100 within the housing 110 of the portable communications device 100. The third RF antenna 120C may similarly be located internal to, for example, on a side of the housing 110 of the portable communications device 100. In one example, the second RF antenna 120B and the third antenna are, for example, planar inverted-F antennas (PI-FAs) typically configured to be a main LTE antenna and a diversity LTE antenna, respectively. However, due to the advantages of the present system (for example, the six-port isolator circuit 150), the second RF antenna 120B and the third RF antenna 120C may be used for communication in both the first communication system 135A and the second communication system 135B.

Although the RF antennas 120 are separated when placed at the top, bottom, and side of the housing 110, the antennas are still electromagnetically coupled. In the absence of the isolator circuit 150, the RF antennas 120 may provide RF interference paths between the respective RF transceivers 130. These RF interference paths are characterized by scattering parameters (for example, the scattering parameters can be used to characterize the RF coupling between transceivers and between antennas). Therefore, the scattering parameters may be used to determine the potential level of RF interference between the RF transceivers 130. For portable two-way radios featuring, for example, LMR and LTE (main and diversity) transceivers, high RF isolation between the antennas is desirable. If RF isolation is poor, both LMR and LTE performances and functionalities will suffer in the absence of the isolator circuit 150.

In the example illustrated, the isolator circuit 150 provides the ability to reduce the RF coupling between (i) the first RF transceiver 130A and (ii) the second RF transceiver 130B and the third RF transceiver 130C over at least one frequency swath overlapping the first range of frequencies 760-870 MHz and between (i) the second RF transceiver 130B and (ii) the third RF transceiver 130C over the first range of frequencies, the second range of frequencies (for example, the LB), and the third range of frequencies (for example, the MHB). The isolator circuit 150 thereby allows the first RF transceiver 130A, the second RF transceiver 130B, and the third RF transceiver 130C to operate concurrently with reduced mutual RF interference levels. Concurrent operation with reduced RF interference levels increases the communication quality of the portable communications device 100. The reduced RF interference levels provided by the isolator circuit 150 also helps facilitate compliance with regulatory limits on spurious RF emissions.

In the embodiment illustrated in FIG. 1, the isolator circuit 150 is coupled between the first RF antenna 120A and the first RF transceiver 130A. The isolator circuit 150 decreases the RF coupling between the first RF transceiver 130A and the second and third RF transceivers 130B-130C in the LB frequency range, where both LMR and LTE communication systems may operate in overlapping and/or non-overlapping frequency swaths. As discussed above, the first RF transceiver 130A and the second and third RF transceivers 130B-130C may also operate in additional frequency bands other than the overlapping frequency swaths in the LB frequency range. In the United States, for example, the first RF transceiver 130A could also operate in the VHF band and/or in the UHF band, while the second and third RF transceivers 130B-130C may also operate in the MB and/or HB frequency ranges. However, there is substantial frequency separation between the VHF/UHF bands and the LB/MHB and between the MHB and the VHF/UHF and the 7/800 MHz bands. In these instances where the first RF transceiver 130A and the second and third RF transceivers 130B-130C are operating in far-apart frequency ranges, potential mutual RF interference is sufficiently mitigated using conventional frequency-domain RF filtering (for example, pass-band filters) at the inputs of the first RF transceiver 130A and the second and third RF transceivers 130B-130C.

The isolator circuit 150 is also coupled between the second RF antenna 120B and the second RF transceiver 130B and between the third RF antenna 120C and the third RF transceiver 130C. The isolator circuit 150 decreases the RF coupling between the second RF transceiver 130B and the third RF transceivers 130C in the LB and MHB frequency ranges. As further described below, the isolator circuit 150 provides improvements in RF isolation between the RF transceivers 130 and thereby improves the efficiency of the RF transceivers 130. The increased efficiency of the RF transceivers 130 results in reduced battery 160 usage to perform the same amount of work thereby improving the battery health of the portable communications device 100. The increase efficiency further provides more reliable communications over large coverage areas.

Figure 2:
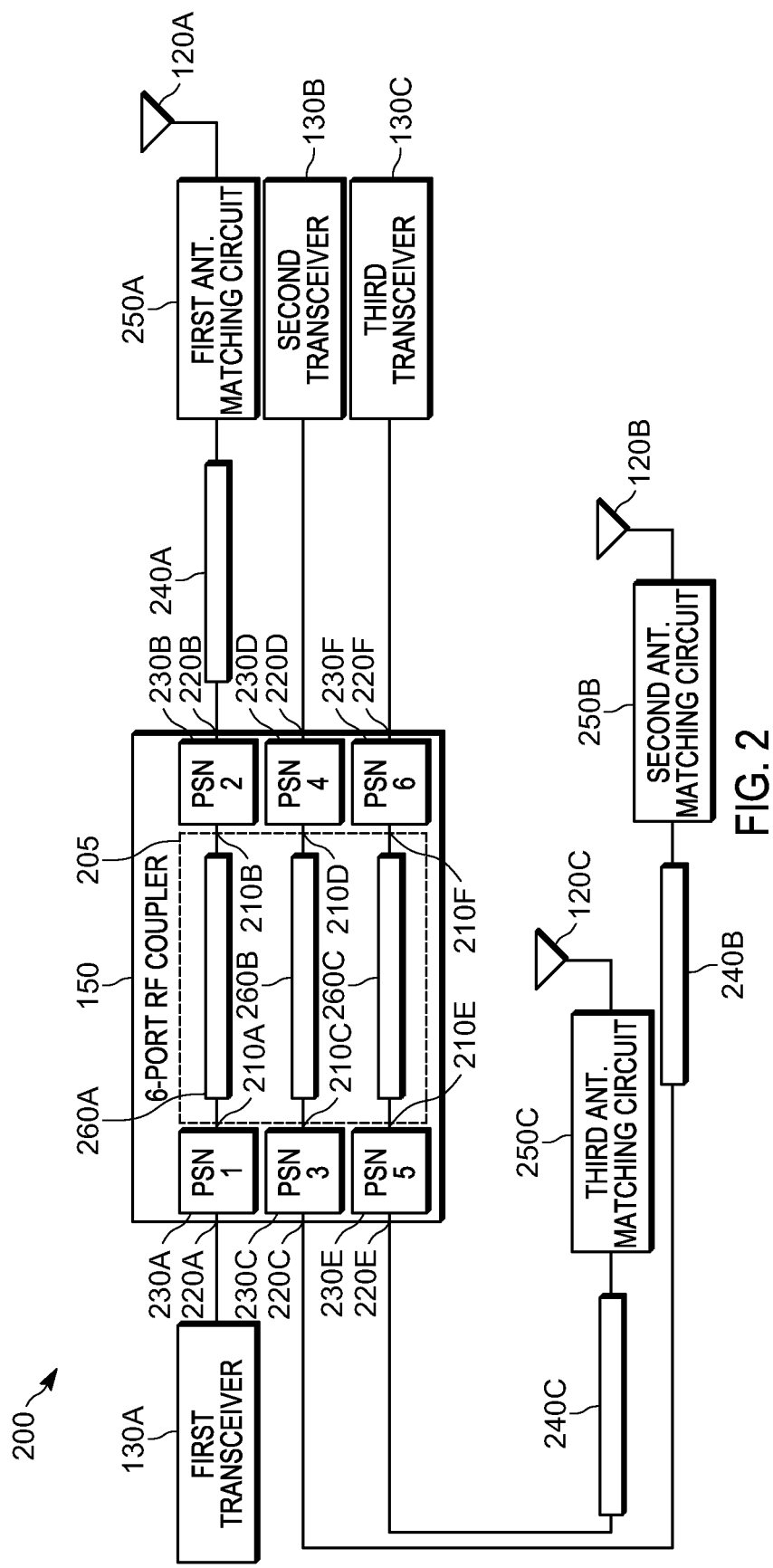
FIG. 2 schematically illustrates a set of wireless communication components of the portable communications device of FIG. 1 in accordance with some embodiments.

FIG. 2 illustrates a set of wireless communication components 200 incorporated in the portable communications device 100. In the example shown, the set of wireless communication components 200 includes the isolator circuit 150 having a six-port RF coupler 205. The six-port RF coupler 205 includes a first coupler port 210A, a second coupler port 210B, a third coupler port 210C, a fourth coupler port 210D, a fifth coupler port 210E, and a sixth coupler port 210F (referred to as the coupler ports 210). The isolator circuit 150 includes a first isolator port 220A, a second isolator port 220B, a third isolator port 220C, a fourth isolator port 220D, a fifth isolator port 220E, and a sixth isolator port 220F (referred to as the isolator ports 220). A first phasor-shaping network (PSN) 230A is coupled between the first isolator port 220A and the first coupler port 210A. A second PSN 230B is coupled between the second isolator port 220B and the second coupler port 210B. A third PSN 230C is coupled between the third isolator port 220C and the third coupler port 210C. A fourth PSN 230D is coupled between the fourth isolator port 220D and the fourth coupler port 210D. A fifth PSN 230E is coupled between the fifth isolator port 220E and the fifth coupler port 210E. A sixth PSN 230F is coupled between the sixth isolator port 220F and the sixth coupler port 210F. The first PSN 230A, the second PSN 230B, the third PSN 230C, the fourth PSN 230D, the fifth PSN 230E, and the sixth PSN 230F are referred to as the PSNs 230. The second PSN 230B, the third PSN 230C, and the fifth PSN 230E form a first three phasor shaping networks 230 coupled between the RF coupler 205 and the RF antenna system 120. The first PSN 230A, the fourth PSN 230D, and the sixth PSN 230F form a second three phasor shaping networks 230 coupled between the RF coupler 205 and the RF transceiver system 130. A PSN 230 generally refers to a multi-port RF network configured to shape the phasors of RF signals being reflected by and signals crossing the multi-port RF network (that is, to alter respective signal magnitudes and phases).

The first isolator port 220A is coupled to the first RF transceiver 130A. The second isolator port 220B is coupled to the first RF antenna 120A through a first RF transmission line 240A and a first antenna matching circuit 250A. The third isolator port 220C is coupled to the second RF antenna 120B through a second RF transmission line 240B and a second antenna matching circuit 250B. The fourth isolator port 220D is coupled to the second RF transceiver 130B. The fifth isolator port 220E is coupled to the third RF antenna 120C through a third RF transmission line 240C and a third antenna matching circuit 250C. The sixth isolator port 220F is coupled to the third RF transceiver 130C. The first RF transmission line 240A, the second RF transmission line 240B, and the third RF transmission line 240C are referred to as RF transmission lines 240. The first antenna matching circuit 250A, the second antenna matching circuit 250B, and the third antenna matching circuit 250C are referred to as antenna matching circuits 250. The antenna matching circuits 250 include electrical components (for example, capacitors, inductors, and the like) that are configured to tune the RF antennas 120 to the frequency band(s) of operation of the corresponding RF transceivers 130. In the example illustrated, the RF transmission lines 240 and the antenna matching circuits 250 are provided outside the isolator circuit 150. The RF transmission lines are configured to transfer RF signals to and from the antennas 120 and the antenna matching circuits 250 are configured to synthesize desirable performances of the antennas 120. In some embodiments, the RF transmission lines 240 and the antenna matching circuits 250 are part of the PSNs 230. In these embodiments, the RF transmission lines 240 and/or the antenna matching circuits 250 are also configured to further improve functionality of the isolator circuit 150.

In the example illustrated, the RF coupler 205 is realized using coupled RF transmission lines (that is, a first coupled RF transmission line 260A, a second coupled RF transmission line 260B, and a third coupled RF transmission line 260C). An RF signal injected at any of the coupler ports 210 may produce output RF signals at all of the other coupler ports 210 due to the electromagnetic coupling between the first coupled RF transmission line 260A, the second coupled RF transmission line 260B, and the third coupled RF transmission line 260C. For example, an RF signal injected at the first coupler port 210A at one end of the first coupled RF transmission line 260A produces a direct-path output at the opposite end of the first coupled RF transmission line 260A corresponding to the second coupler port 210B, as well as a reverse coupled-path RF signal at a near end of the second coupled RF transmission line 260B and the third coupled RF transmission line 260C corresponding to the third coupler port 210C and the fifth coupler port 210E respectively and a forward coupled-path RF signal at a far end of the second coupled RF transmission line 260B and the third coupled RF transmission line 260C corresponding to the fourth coupler port 210D and the sixth coupler port 210F respectively. The isolator circuit 150 is therefore configured to produce disruptive superposition of all RF signals flowing between the first RF transceiver 130A, the second RF transceiver 130B, and the third RF transceiver 130C through the isolator circuit 150 and the antennas 120. The RF signal distribution effected by the RF coupler 205 is advantageously exploited to achieve substantial cancellation of RF signals flowing between each pair of the first RF transceiver 130A, the second RF transceiver 130B, and the third RF transceiver 130C, as further described below. This RF signal distribution effected by the RF coupler 205 is also advantageously exploited to allow all three RF antennas 120 to be used for communication in the first communication system 135A and the second communication system 135B using the RF transceivers 130 as described above.

The PSNs 230 may incorporate lumped and distributed RF circuit elements and transmission lines. The first PSN 230A is, for example, an LMR matching network and includes reactive impedance elements (for example, capacitors, inductors, and the like) connected between an input and an output of the first PSN 230A. The first PSN 230A may include RF switches and tunable RF components (voltage-controlled capacitors, variable phase shifter, and the like). The first PSN 230A can be controlled by the electronic processor 140 through the control and/or data buses 145 to be reconfigured to provide desirable phasor-shaping behaviors for maximum power transfer between the first RF transceiver 130A, for example and a corresponding transceiver of another portable communications device 100 of the first wireless communication system 135A, and to further improve the functionality of the isolator circuit 150. The fourth PSN 230D and the sixth PSN 230F are, for example, LTE matching and tuning networks and similarly include impedance elements connected between an input and an output of the fourth PSN 230D and the sixth PSN 230F respectively. The fourth PSN 230D and the sixth PSN 230F may include RF switches and tunable RF components (voltage-controlled capacitors, variable phase shifter, and the like). The fourth PSN 230D and the sixth PSN 230F can be controlled by the electronic processor 140 through the control and/or data buses 145 to be reconfigured to provide desirable phasor-shaping behaviors for maximum power transfer between the second RF transceiver 130B and/or the third RF transceiver 130C and, for example, corresponding transceiver(s) of another portable communications device 100 of the second wireless communication system 135B and to further improve the functionality of the isolator circuit 150. In some embodiments, the transceivers 130 may similarly incorporate matching and tuning networks including, for example, RF switches and tunable RF components (for example, voltage-controlled capacitors, variable phase shifter, and the like) to further enhance the wireless communications performances. In these embodiments, RF switching components may be avoided in the PSNs 230.

The second PSN 230B, the third PSN 230C, and the fifth PSN 230E may be optimized to effect the RF interference cancellation in the LB and MHB. The second PSN 230B, the third PSN 230C, and the fifth PSN 230E provide a phasor-shaping functionality that produces desirable magnitude and phase alteration to RF signals flowing through RF interference paths between the transceivers 130 to minimize the resulting RF interference signal magnitude.

In some embodiments, some or all of the functionality of the PSNs 230 is performed by the first RF transceiver 130A, the second RF transceiver 130B, the third RF transceiver 130C, the first RF antenna 120A, the second RF antenna 120B, and/or the third RF antenna 120C. Additionally, this approach avoids placement of tunable components under potentially disruptive large RF signal interference conditions because the isolator circuit 150 provides sufficient attenuation to the resulting RF interference signal.

FIGS. 1 and 2 illustrate only one example embodiment of the portable communications device 100 and the set of wireless communication components 200 including the isolator circuit 150. The portable communications device 100 and the set of wireless communication components 200 may include more or fewer components than those illustrated in FIGS. 1 and 2 and may perform functions other than those described herein. The isolator circuit 150 may be implemented in different ways to provide RF isolation between the first RF transceiver 130A the second RF transceiver 130B, and the third RF transceiver 130C. In on example, the electrical operation and/or the physical realization of the RF coupler 205 may be different from the coupled RF transmission lines 260.

Figure 3A:
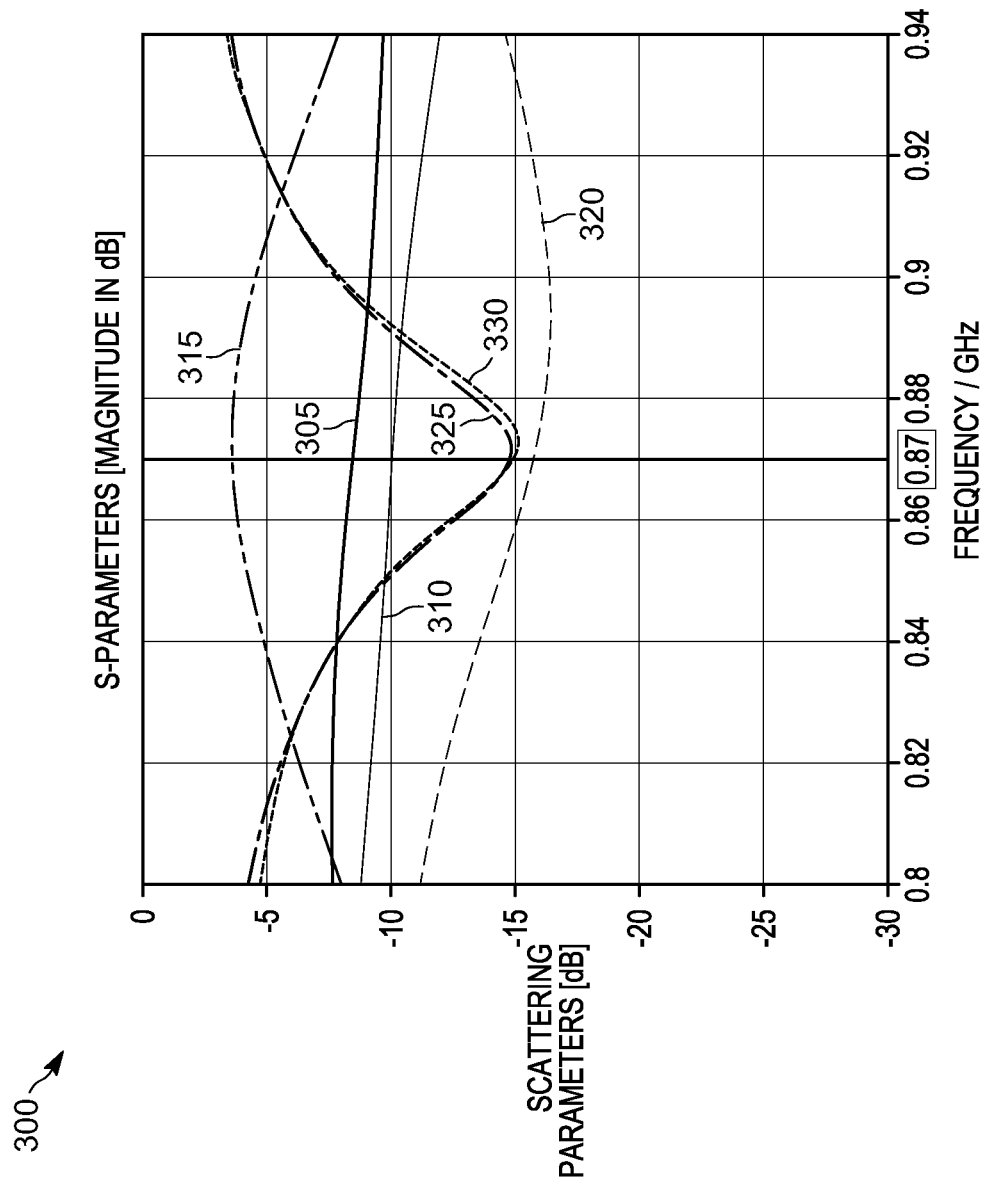
FIGS. 3A and 3B are graphs showing the RF isolation improvement from a six-port isolator circuit between a first transceiver, a second transceiver, and a third transceiver of the set of wireless communication components of FIG. 2 in accordance with some embodiments.
Figure 3B:
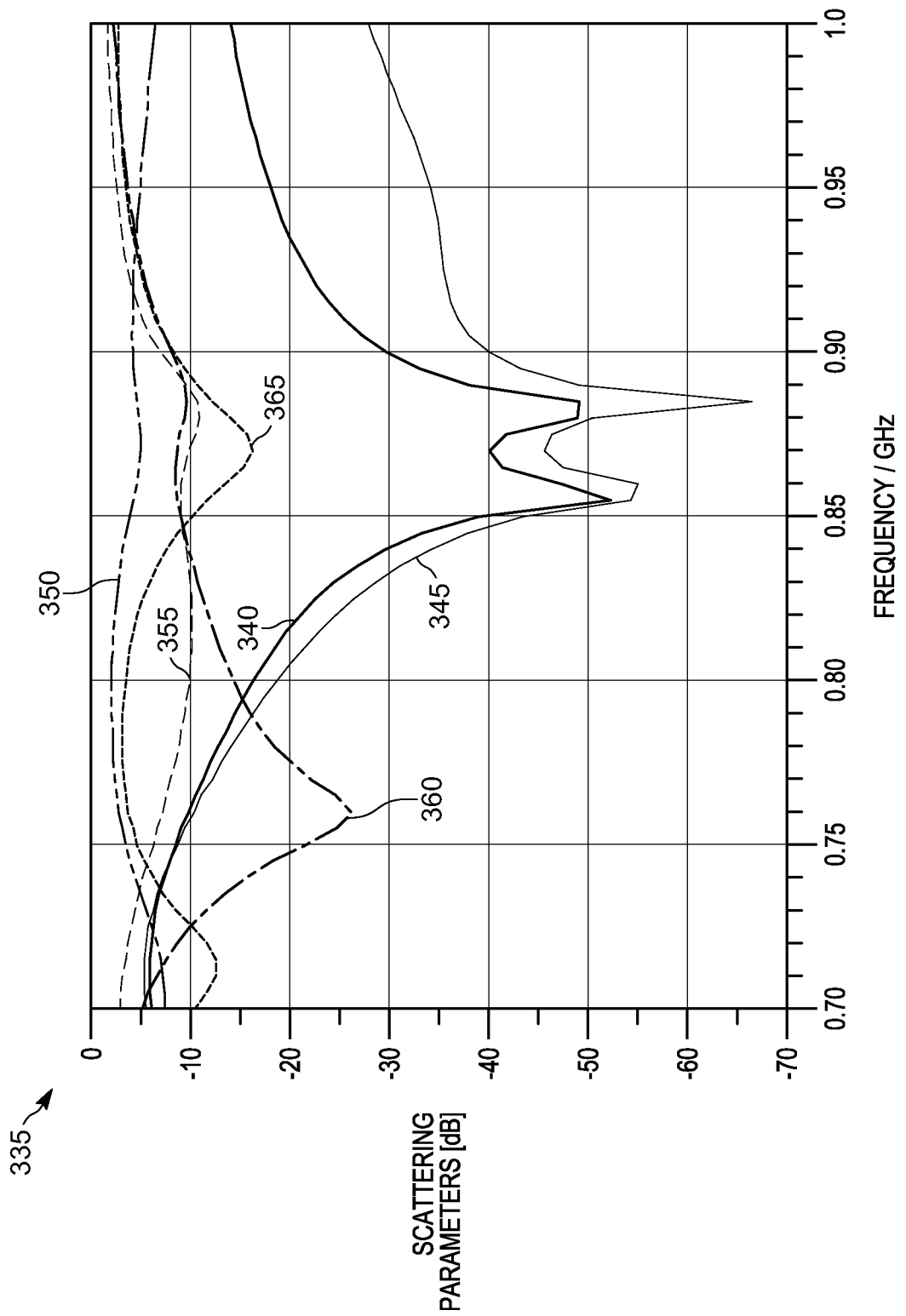

An example of RF interference cancellation achievable using the isolator circuit 150, across a frequency range encompassing the LB and the 7/800 MHz band is provided in FIGS. 3A and 3B. With reference to FIG. 3A, the plots 300, including decibel (dB)-scale magnitudes of the scattering parameters representing the RF coupling between respective input ports of the first RF transceiver 130A, the second RF transceiver 130B, and the third RF transceiver 130C, show the plot 305 illustrating the RF coupling between the first RF transceiver 130A and the second RF transceiver 130B, the plot 310 illustrating the RF coupling between the first RF transceiver 130A and the third RF transceiver 130C, and the plot 315 illustrating the RF coupling between the second RF transceiver 130B and the third RF transceiver 130C. The plots 300 also show plot 320 illustrating the RF self coupling of the first RF transceiver 130A (that is, the "return loss"), plot 325 illustrating the RF self coupling of the second RF transceiver 130B, and plot 330 illustrating the RF self coupling of the third RF transceiver 130C. The plots 300 of FIG. 3A illustrate a situation in which the isolator circuit 150 is not employed. In this example, the antennas 120 are well impedance-matched to the respective transceivers 130 about a design frequency of 870 MHz, within the LB and the 7/800 MHz band. The RF coupling between the first RF transceiver 130A and the second and third RF transceivers 130B-130C is roughly between −8 dB and −10 dB and the RF coupling between the second RF transceiver 130B and the third RF transceiver 130C is approximately −3.5 dB.

With reference to FIG. 3B, the plots 335, including dB-scale magnitudes of the scattering parameters between respective input ports of the first RF transceiver 130A, the second RF transceiver 130B, and the third RF transceiver 130C, show the plot 340 illustrating the RF coupling between the first RF transceiver 130A and the second RF transceiver 130B, the plot 345 illustrating the RF coupling between the first RF transceiver 130A and the third RF transceiver 130C, and the plot 350 illustrating the RF coupling between the second RF transceiver 130B and the third RF transceiver 130C. The plots 300 also show plot 355 illustrating the RF self coupling of the first RF transceiver 130A (that is, the "return loss"), plot 360 illustrating the RF self coupling of the second RF transceiver 130B, and plot 365 illustrating the RF self coupling of the third RF transceiver 130C. The plots 335 illustrate the improvements in RF isolation when the isolator circuit 150 is employed.

The isolator circuit 150 provides 30 dB or more RF isolation between the first RF transceiver 130A and the second and third RF transceivers 130B-130C across a large frequency range about the design frequency of 870 MHz, within the LB and the 7/800 MHz band. This RF isolation is significantly higher than the RF isolation that would be typically provided by optimizing design of the antennas and optimizing placement of the antennas on the portable communications device 100 as shown in FIG. 3A. Additionally, the isolator circuit 150 improves the RF isolation between the second RF transceiver 130B and the third RF transceiver 130C to approximately −5 dB or more.

Figure 4:
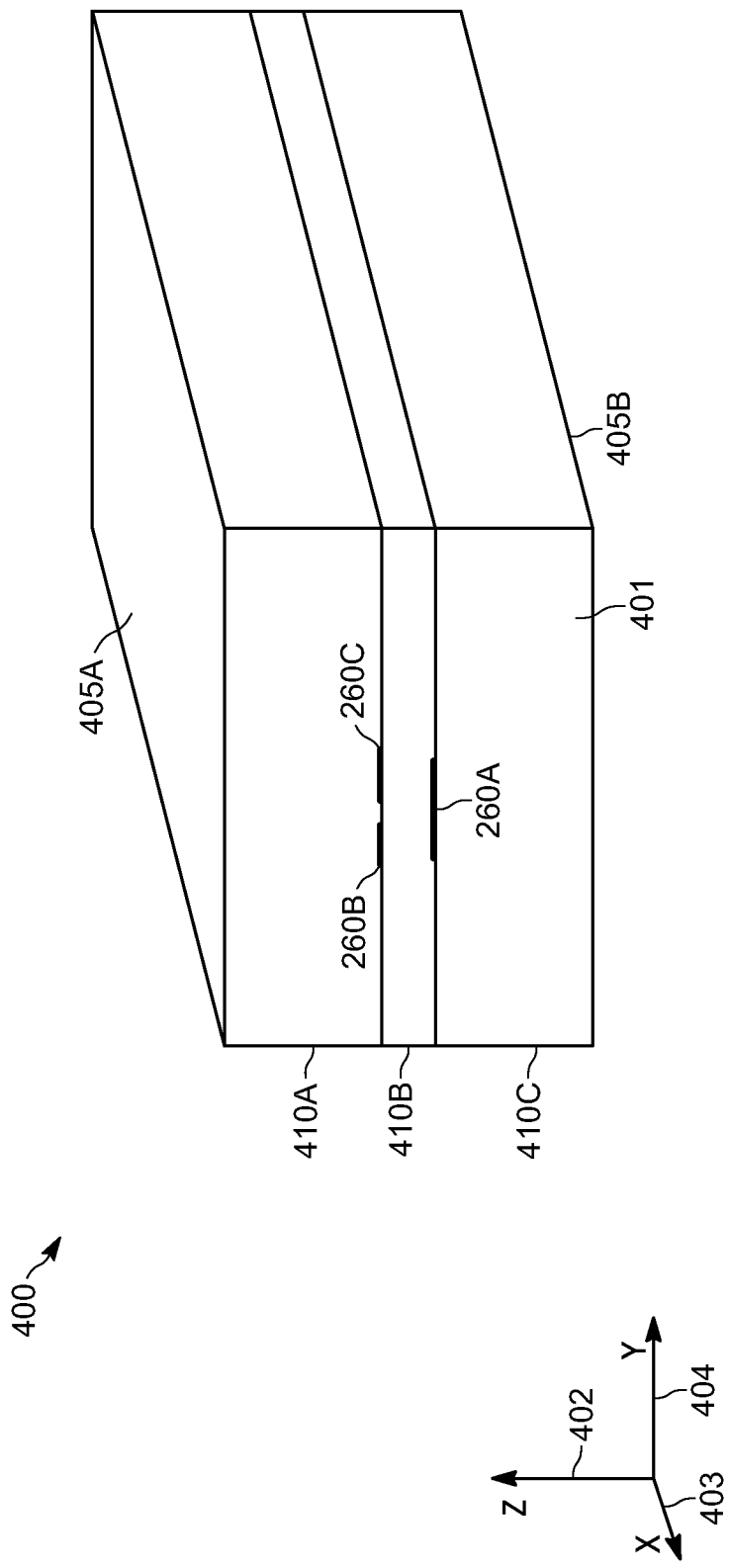
FIG. 4 illustrates a physical construction of an RF coupler of the set of wireless communication components of FIG. 2 in accordance with some embodiments.

FIG. 4 illustrates a perspective cross-section view 401 of a physical construction 400 of the RF coupler 205 according to one example embodiment. In the example illustrated, the RF coupler 205 is based on RF stripline technology constructed in printed circuit board (PCB) technology using three layers 410A-410C of dielectric material stacked along a vertical dimensions 402 with Cartesian abscissa Z. For simplicity of illustration, the lateral truncations of the dielectric layers 410A-10C in the physical construction 400, along the lateral dimensions 403 and 404 corresponding to the Cartesian abscissas X and Y respectively, are not shown. The outermost surfaces of the physical construction 400 of the RF coupler 205 along the vertical dimension Z, including face 405A of the layer 410A and a face 405B of the layer 410C, are cladded with respective metal layers. The coupled RF transmission lines 260 are realized by providing metal strips sandwiched between the layers 410. The second coupled RF transmission line 260B and the third coupled RF transmission line 260C are provided between the first dielectric layer 410A and the second dielectric layer 410B. The first coupled RF transmission line 260A is provided between the second dielectric layer 410B and the third dielectric layer 410C. The coupled RF transmission lines 260 extend substantially along a length of the RF coupler 205 along the lateral dimension 403, while their cross-sectional widths are oriented along the lateral dimension 404 as illustrated in the cross-sectional view 401. The cross-sectional thickness of the coupled RF transmission lines 260, which are substantially smaller than their respective length and width, are not illustrated in detail in FIG. 4. The first coupled RF transmission line 260A, the second coupled RF transmission line 260B, and the third coupled RF transmission line 260C are provided substantially parallel to each other along the length of the RF coupler 205 along the lateral dimension 403. The geometrical dimension and relative proximity of the coupled RF transmission lines 260 are configured to realize desirable RF signal reflection, reverse coupled-path, and forward coupled-path RF signal levels at the ports of the RF coupler 205.

In some embodiments, additional RF couplers may be used to provide further RF isolation between the RF transceivers 130. With reference to FIG. 5A, a second RF coupler 705 is provided between (i) the first RF coupler 205 and (ii) the second RF transceiver 130B and the third RF transceiver 130C. The second RF coupler 705 is a six-port RF coupler similar to the first RF coupler 205. The second RF coupler 705 includes three coupled RF transmission lines 760. In some embodiments, the second RF coupler 705 is a four-port RF coupler and includes only two coupled RF transmission lines 760. In the example illustrated, a first coupler port 710A and a second coupler port 710B of the second RF coupler 705 do not connect to any components. The third coupler port 710C and the fifth coupler port 710E of the second RF coupler 705 are respectively coupled to the fourth coupler port 210D and the sixth coupler port 210F of the first RF coupler 205. The fourth coupler port 710D of the second RF coupler 705 is coupled to the second RF transceiver 130B through the fourth PSN 230D and the sixth coupler port 710F of the second RF coupler 705 is coupled to the third RF transceiver 130C through the sixth PSN 230F. The remaining connections of the first RF coupler 205 are similar to the embodiment provided in FIG. 2. The first coupled RF transmission line 760A couples the first coupler port 710A to the second coupler port 710B, the second coupled RF transmission line 760B couples the third coupler port 710C to the fourth coupler port 710D, and the third coupled RF transmission line 760C couples the fifth coupler port 710E to the sixth coupler port 710F. In the example illustrated, the first coupled RF transmission line 760A may be an optional floating line that does not directly couple to any RF transceivers 130 and RF antennas 120 through the first coupler port 710A and the second coupler port 710B to provide desirable electromagnetic coupling with the coupled RF transmission line 760B and with the coupled RF transmission line 760C. Alternatively, the first coupled RF transmission line 760A may be electrically coupled at either or both the first coupler port 710A and the second coupler port 720B to respective PSNs (not shown) to provide alternative desirable electromagnetic coupling with the coupled RF transmission line 760B and with the coupled RF transmission line 760C.

In some embodiments, as shown in FIGS. 5B and 5C the second RF coupler 705 is provided between (i) the first RF coupler 205 and (ii) the first RF antenna 120A and any one of the second RF transceiver 130B and third RF transceiver 130C. In these embodiments, the first coupler port 710A of the second RF coupler 705 is coupled to the second coupler port 210B of the first RF coupler 205, the second coupler port 710B is coupled to the first antenna 120A through the second PSN 230B. With reference to FIG. 5B, the third coupler port 710C and the fourth coupler port 710D of the second RF coupler 705 do not connect to any components. The fifth coupler port 710E of the second RF coupler 705 is coupled to the sixth coupler port 210F of the first RF coupler 205. The sixth coupler port 710F of the second RF coupler 705 is coupled to the third RF transceiver 130C through the sixth PSN 230F. The remaining connections of the first RF coupler 205 are similar to the embodiment provided in FIG. 2. With reference to FIG. 5C, the fifth coupler port 710E and the sixth coupler port 710F of the second RF coupler 705 do not connect to any components. The third coupler port 710C of the second RF coupler 705 is coupled to the fourth coupler port 210D of the first RF coupler 205. The fourth coupler port 710D of the second RF coupler 705 is coupled to the second RF transceiver 130B through the fourth PSN 230D. The remaining connections of the first RF coupler 205 are similar to the embodiment provided in FIG. 2

With reference to FIG. 5D, a third RF coupler 805 is provided between (i) the first RF coupler 205 and (ii) the second RF antenna 120B and the third RF antenna 120C. The third RF coupler 805 is a six-port RF coupler similar to the first RF coupler 205 and the second RF coupler 705. The third RF coupler 805 includes three coupled RF transmission lines 860. In some embodiments, the third RF coupler 805 is a four-port RF coupler and includes only two coupled RF transmission lines 860. In the example illustrated, a first coupler port 810A and a second coupler port 810B of the third RF coupler 805 do not connect to any components. The fourth coupler port 810D and the sixth coupler port 810F of the third RF coupler 805 are respectively coupled to the third coupler port 210C and the fifth coupler port 210E of the first RF coupler 205. The third coupler port 810C of the third RF coupler 805 is coupled to the second RF antenna 120B through the third PSN 230C and the fifth coupler port 810E of the third RF coupler 805 is coupled to the third RF antenna 120C through the fifth PSN 230E. The remaining connections of the first RF coupler 205 are similar to the embodiment provided in FIG. 2. The first coupled RF transmission line 860A couples the first coupler port 810A to the second coupler port 810B, the second coupled RF transmission line 860B couples the third coupler port 810C to the fourth coupler port 810D, and the third coupled RF transmission line 860C couples the fifth coupler port 810E to the sixth coupler port 810F. In the example illustrated, the first coupled RF transmission line 860A may be an optional floating line that does not directly couple to any RF transceivers 130 and RF antennas 120 through the first coupler port 810A and the second coupler port 810B to provide desirable electromagnetic coupling with the coupled RF transmission line 860B and with the coupled RF transmission line 860C.

In some embodiments, as shown in FIGS. 5E and 5F the third RF coupler 805 is provided between (i) the first RF coupler 205 and (ii) the first RF transceiver 130A and any one of the second RF antenna 120B and third RF antenna 120C. In these embodiments, the first coupler port 810A of the third RF coupler 805 is coupled to the first RF transceiver 130A through the first PSN 230A and the second coupler port 810B is coupled to the first coupler port 210A of the first RF coupler 205. With reference to FIG. 5E, the third coupler port 810C and the fourth coupler port 810D of the third RF coupler 805 do not connect to any components. The sixth coupler port 810F of the third RF coupler 805 is coupled to the fifth coupler port 210E of the first RF coupler 205. The fifth coupler port 810E of the third RF coupler 805 is coupled to the third RF antenna 120C through the fifth PSN 230E. The remaining connections of the first RF coupler 205 are similar to the embodiment provided in FIG. 2. With reference to FIG. 5F, the fifth coupler port 810E and the sixth coupler port 810F of the third RF coupler 805 do not connect to any components. The third coupler port 810C of the third RF coupler 805 is coupled to the second RF antenna 120B through the third PSN 230C. The fourth coupler port 810D of the third RF coupler 805 is coupled to the third coupler port 210C of the first RF coupler 205. The remaining connections of the first RF coupler 205 are similar to the embodiment provided in FIG. 2.

Figure 5G:
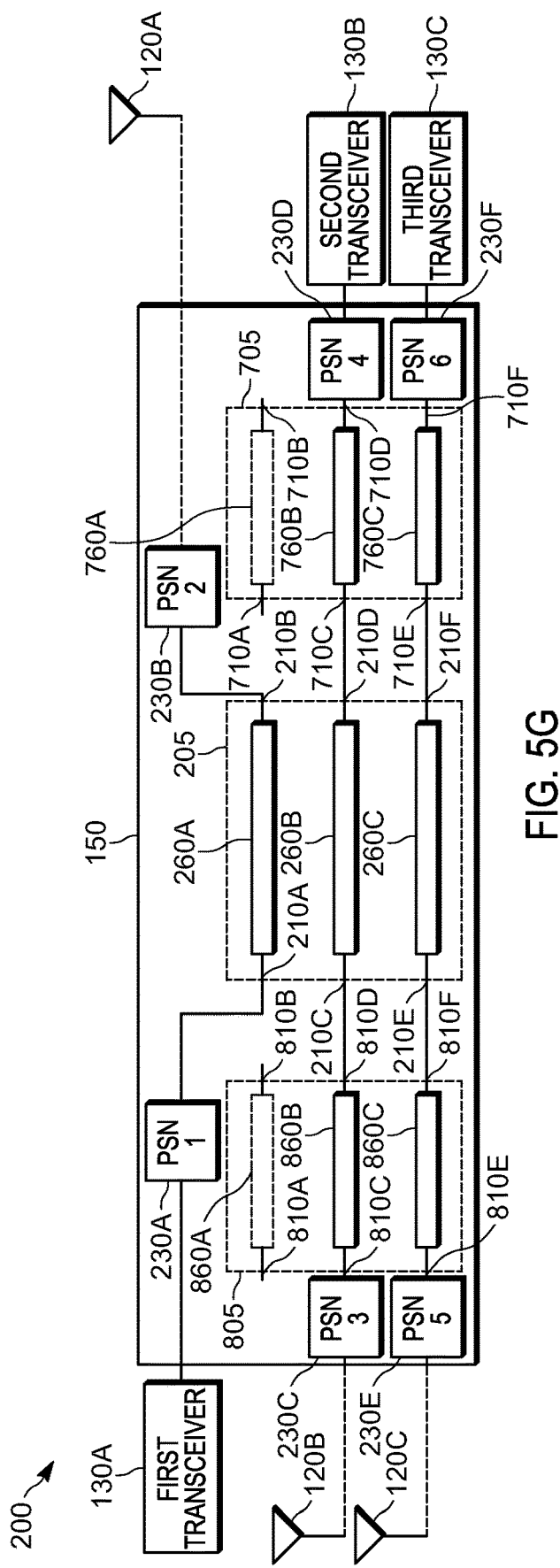

With reference to FIG. 5G, two additional RF couplers 705 and 805 are used to provide further RF isolation between the RF transceivers 130 when combining the embodiments of FIGS. 5A and 5D. In the example illustrated, the second RF coupler 705 is provided between (i) the first RF coupler 205 and (ii) the second RF transceiver 130B and the third RF transceiver 130C. The second RF coupler 705 may be implemented similar to the second RF coupler 705 in the example of FIG. 5A. In the example illustrated, a first coupler port 710A and a second coupler port 710B of the second RF coupler 705 do not connect to any components. The third coupler port 710C and the fifth coupler port 710E of the second RF coupler 705 are respectively coupled to the fourth coupler port 210D and the sixth coupler port 210F of the first RF coupler 205. The fourth coupler port 710D of the second RF coupler 705 is coupled to the second RF transceiver 130B through the fourth PSN 230D and the sixth coupler port 710F of the second RF coupler 705 is coupled to the third RF transceiver 130C through the sixth PSN 230F. A third RF coupler 805 is provided between (i) the first RF coupler 205 and (ii) the second RF antenna 120B and the third RF antenna 120C. The third RF coupler 805 may be implemented similar to the second RF coupler 705 in the example of FIG. 5D. In the example illustrated, a first coupler port 810A and a second coupler port 810B of the third RF coupler 805 do not connect to any components. The fourth coupler port 810D and the sixth coupler port 810F of the third RF coupler 805 are respectively coupled to the third coupler port 210C and the fifth coupler port 210E of the first RF coupler 205. The third coupler port 810C of the third RF coupler 805 is coupled to the second RF antenna 120B through the third PSN 230C and the fifth coupler port 810E of the third RF coupler 805 is coupled to the third RF antenna 120C through the fifth PSN 230E. The remaining connections of the first RF coupler 205 are similar to the embodiment provided in FIG. 2. That is, the first coupler port 210A is coupled to the first RF transceiver 130A through the first PSN 230A and the second coupler port 210B is coupled to the first RF antenna 120A through the second PSN 230B. The first coupled RF transmission line 760A couples the first coupler port 710A to the second coupler port 710B, the second coupled RF transmission line 760B couples the third coupler port 710C to the fourth coupler port 710D, and the third coupled RF transmission line 760C couples the fifth coupler port 710E to the sixth coupler port 710F. In the example illustrated, the first coupled RF transmission line 760A may be an optional floating line that does not directly couple to any RF transceivers 130 and RF antennas 120 through the first coupler port 710A and the second coupler port 710B to provide desirable electromagnetic coupling with the coupled RF transmission line 760B and with the coupled RF transmission line 760C. Alternatively, the first coupled RF transmission line 760A may be electrically coupled at either or both first coupler port 710A and the second coupler port 720B to respective PSNs (not shown) to provide alternative desirable electromagnetic coupling with the coupled RF transmission line 760B and with the coupled RF transmission line 760C. A first coupled RF transmission line 860A couples the first coupler port 810A to the second coupler port 810B, the second coupled RF transmission line 860B couples the third coupler port 810C to the fourth coupler port 810D, and the third coupled RF transmission line 860C couples the fifth coupler port 810E to the sixth coupler port 810F. In the example illustrated, the first coupled RF transmission line 860A may be an optional floating line that does not directly couple to any RF transceivers 130 and RF antennas 120 through the first coupler port 810A and the second coupler port 810B to provide desirable electromagnetic coupling with the coupled RF transmission line 860B and with the coupled RF transmission line 860C. Alternatively, the first coupled RF transmission line 860A may be electrically coupled at either or both first coupler port 810A and the second coupler port 820B to respective PSNs (not shown) to provide alternative desirable electromagnetic coupling with the coupled RF transmission line 860B and with the coupled RF transmission line 860C.

With reference to FIG. 5G, in some embodiments, the second RF coupler 705 is provided between (i) the first RF coupler 205 and (ii) the first RF antenna 120A and any one of the second RF transceiver 130B and third RF transceiver 130C. In these embodiments, the second RF coupler 705 may be implemented in similar ways as shown in FIGS. 5B and 5C.

With reference to FIG. 5G, in some embodiments, the third RF coupler 805 is provided between (i) the first RF coupler 205 and (ii) the first RF transceiver 130A and any one of the second RF antenna 120B and third RF antenna 120C. In these embodiments, the third RF coupler 805 may be implemented in similar ways as shown in FIGS. 5E and 5F.

Figure 6A:
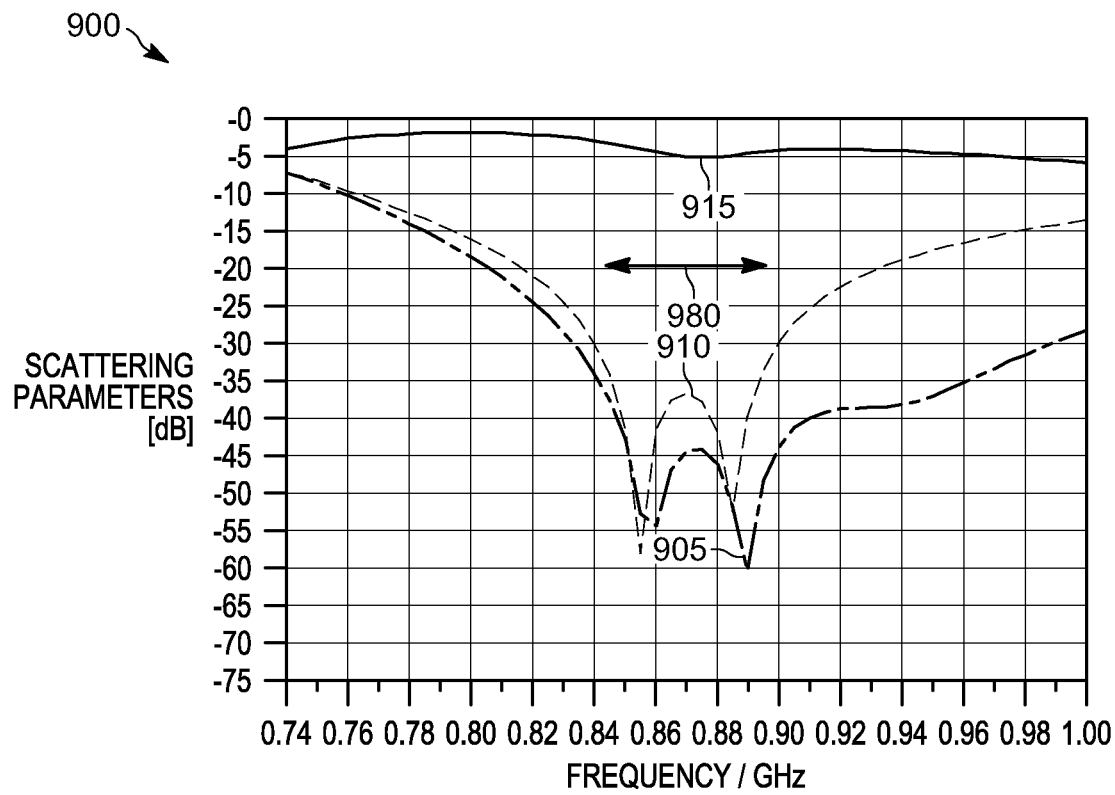
FIGS. 6A-6D are graphs illustrating efficiency and RF isolation improvements achieved from the sets of wireless communication components of FIGS. 5A-5G in accordance with some embodiments.
Figure 6B:
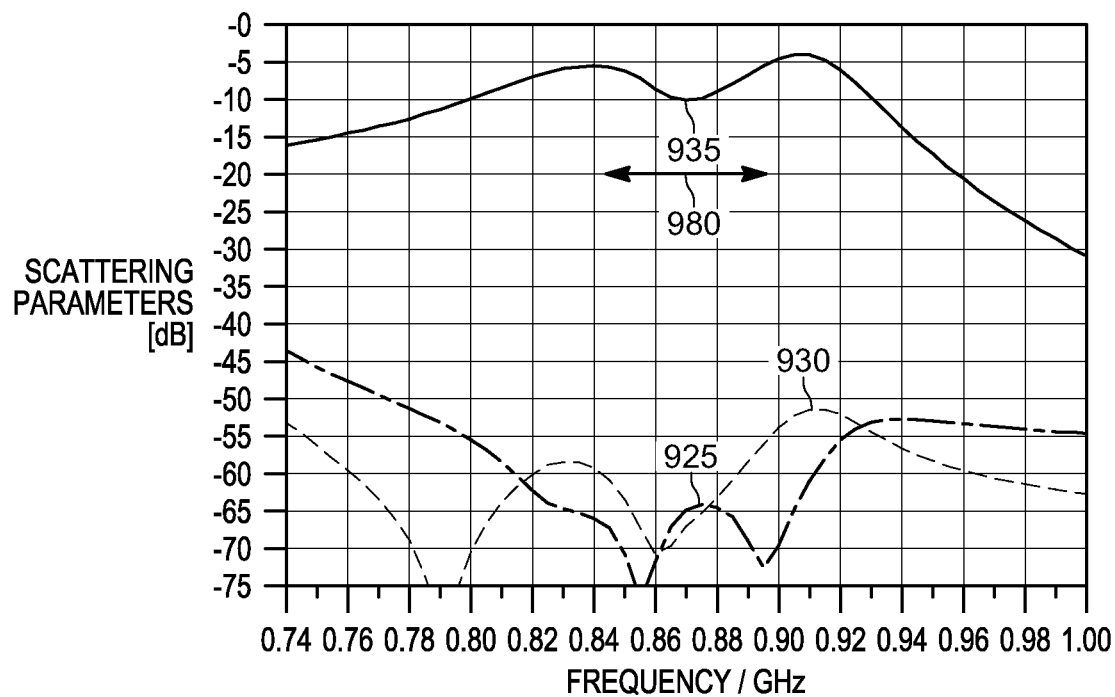
Figure 6C:
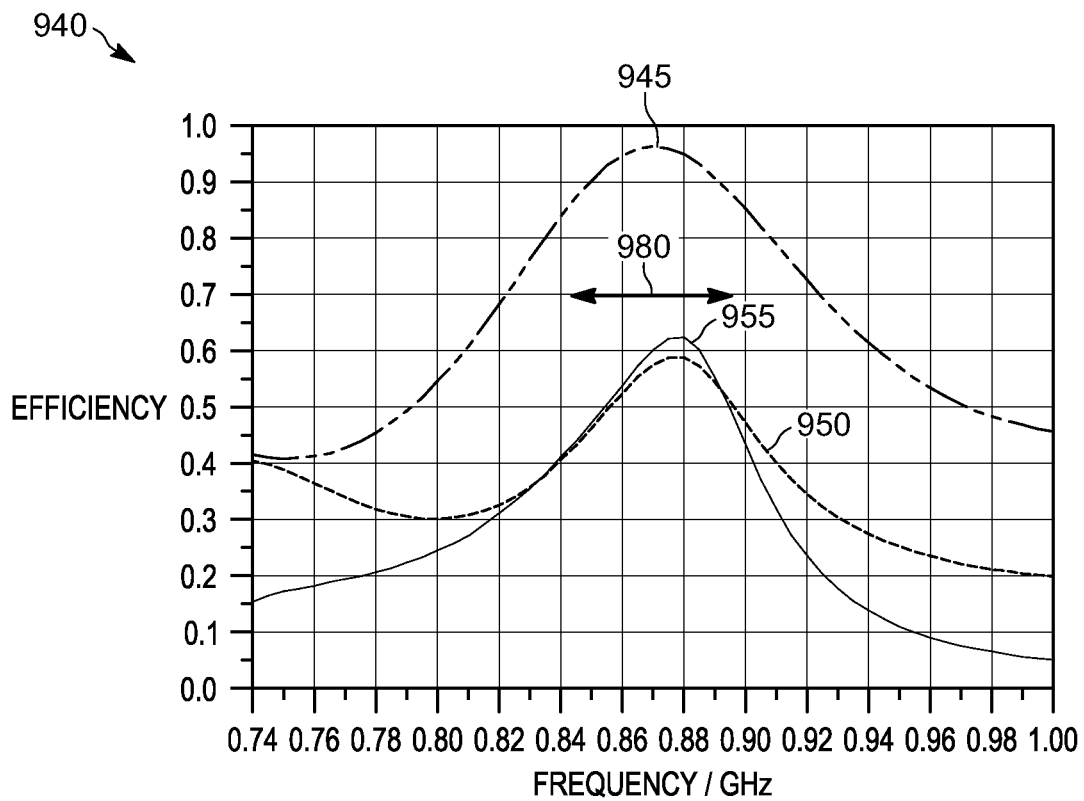
Figure 6D:
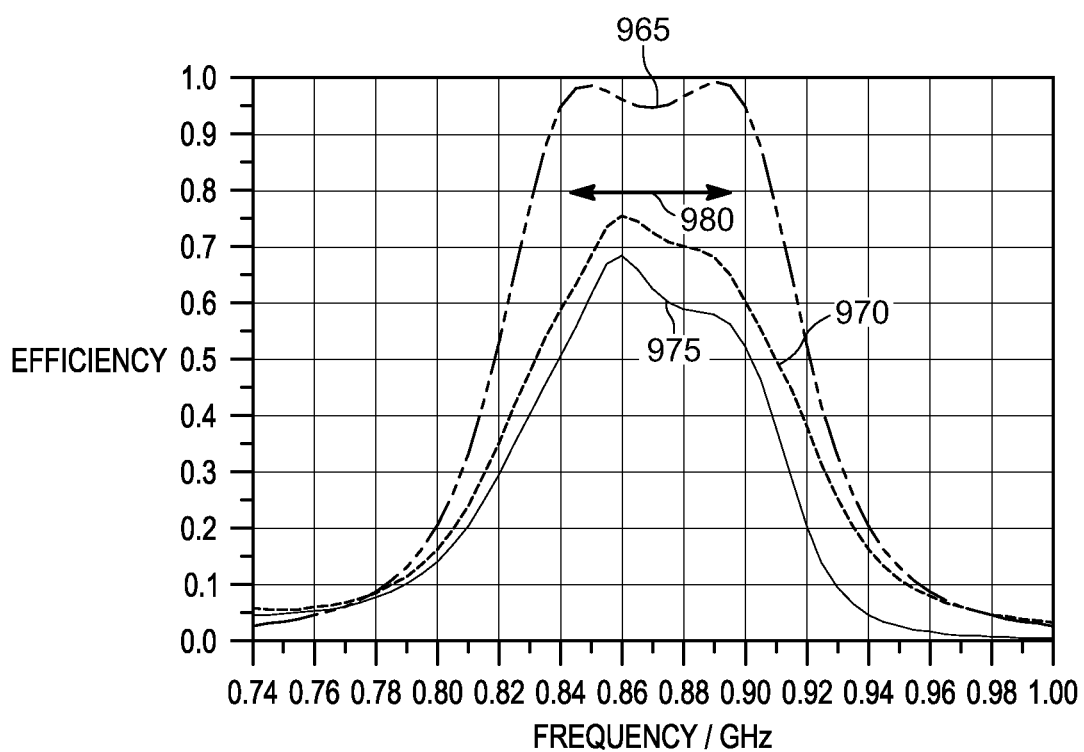

FIGS. 6A and 6B illustrate graphs that demonstrate one example of how RF interference cancellation is improved using the additional RF coupler (for example, the second RF coupler 705 and/or the third RF coupler 805) as disclosed by the embodiments of FIGS. 5A-5G across a frequency range encompassing the LB and the 7/800 MHz band about the design frequency 870 MHz (targeting the 840-900 MHz frequency range, as indicated by label 980 in FIGS. 6A-6D0. FIG. 6A, illustrates various plots 900, including dB-scale magnitudes of the scattering parameters between respective input ports of the first RF transceiver 130A, the second RF transceiver 130B, and the third RF transceiver 130C. Plot 905 illustrates the RF coupling between the first RF transceiver 130A and the second RF transceiver 130B. Plot 910 illustrates the RF coupling between the first RF transceiver 130A and the third RF transceiver 130C. Plot 915 illustrates the RF coupling between the second RF transceiver 130B and the third RF transceiver 130C. The plots 900 of FIG. 6A illustrate a situation in which only the first RF coupler 205 is employed. In this example, RF isolation between the first RF transceiver 130A and the second and third RF transceivers 130B-130C is between −35 dB and −60 dB and the RF isolation between the second RF transceiver 130B and the third RF transceiver 130C is approximately −5 dB in the frequency range about the design frequency 870 MHz.

FIG. 6B, illustrates plots 920, including dB-scale magnitudes of the scattering parameters between respective input ports of the first RF transceiver 130A, the second RF transceiver 130B, and the third RF transceiver 130C. Plot 925 illustrates the RF coupling between the first RF transceiver 130A and the second RF transceiver 130B. Plot 930 illustrates the RF coupling between the first RF transceiver 130A and the third RF transceiver 130C. Plot 935 illustrates the RF coupling between the second RF transceiver 130B and the third RF transceiver 130C. The plots 920 illustrate the improvements in RF isolation when the additional RF coupler (for example, the second RF coupler 705 and/or the third RF coupler 805) is employed. In this example, RF isolation between the first RF transceiver 130A and the second and third RF transceivers 130B-130C is improved to between 50 dB and 75 dB and the RF isolation between the second RF transceiver 130B and the third RF transceiver 130C is improved to between −5 dB and −10 dB in the frequency range encompassing the LB and the 7/800 MHz band. Additionally, the improved RF isolation is achieved over a much wider frequency span about the design frequency 870 MHz than when only the first RF coupler 205 is employed.

FIGS. 6C and 6D illustrate efficiency graphs (that is, the radiation efficiency including impedance mismatch losses) that demonstrate another aspect related to the improved wireless communication performance due to RF interference cancellation achieved using the additional RF coupler (for example, the second RF coupler 705 and/or the third RF coupler 805) as disclosed by the embodiments of FIGS. 5A-5G, across a frequency range encompassing the LB and the 7/800 MHz band. With reference to FIG. 6C, plot 945 illustrates the efficiency of the first RF transceiver 130A. Plot 950 illustrates the efficiency of the second RF transceiver 130B, and plot 955 illustrates the efficiency of the third RF transceiver 130C in the frequency range encompassing the LB and the 7/800 MHz band about the design frequency 870 MHz. Plots 940 of FIG. 6C illustrate a situation in which only the first RF coupler 205 is employed. In this example, the efficiency of the first RF transceiver 130A is between 85-95%, the efficiency of the second RF transceiver 130B is between 40-60%, and the efficiency of the third RF transceiver 130C is between 40-65% in the frequency range encompassing the LB and the 7/800 MHz band about the design frequency 870 MHz.

FIG. 6D includes plots 960. Plot 965 illustrates the efficiency of the first RF transceiver 130A. Plot 970 illustrates the efficiency of the second RF transceiver 130B, and plot 975 illustrates the efficiency of the third RF transceiver 130C. Plots 960 illustrate the improvements in efficiency when the additional RF coupler (for example, the second RF coupler 705 and/or the third RF coupler 805) is employed.

In this example, efficiency of the first RF transceiver 130A is improved to between 95-100%, efficiency of the second RF transceiver 130B is improved to between 60-75%, and efficiency of the third RF transceiver 130C is improved to between 50-70% in the frequency range encompassing the LB and the 7/800 MHz band about the design frequency 870 MHz.

Advantages of using the six-port isolator circuit 150 include improvements in RF isolation between the LMR transceiver (for example, a first RF transceiver 130A), the main LTE transceiver (for example, a second RF transceiver 130B), and the diversity transceiver (for example, a third RF transceiver 130C) and radiation efficiency improvements in the LMR transceiver, the main LTE transceiver, and the diversity LTE transceiver.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A portable communications device comprising:
   a housing;
   a radio-frequency (RF) antenna system including a first RF antenna, a second RF antenna, and a third RF antenna supported by the housing;
   an RF transceiver system including a first RF transceiver, a second RF transceiver, and a third RF transceiver operating in respective RF bands; and
   an isolator circuit coupled to the RF antenna system and the RF transceiver system and configured to provide RF isolation between the first RF transceiver, the second RF transceiver, and the third RF transceiver, the isolator circuit including
      a first RF coupler realized using coupled RF transmission lines and featuring six RF coupler ports coupled to the first RF antenna, the second RF antenna, the third RF antenna, the first RF transceiver, the second RF transceiver, and the third RF transceiver through respective phasor shaping networks; and
      a second RF coupler coupled between (i) the second RF transceiver and the third RF transceiver; and (ii) the first RF coupler, the second RF coupler configured to provide RF isolation between the first RF transceiver, the second RF transceiver, and the third RF transceiver.

2. The portable communications device of claim 1, wherein the respective phasor shaping networks include a first three phasor shaping networks coupled between the first RF coupler and the RF antenna system and a second three phasor shaping networks coupled between the first RF coupler and the RF transceiver system, wherein the first three phasor shaping networks are coupled to the RF antenna system through RF transmission lines.

3. The portable communications device of claim 1, wherein the isolator circuit further comprises a third RF coupler coupled between (i) the first RF coupler; and (ii) the second RF antenna and the third RF antenna.

4. The portable communications device of claim 1, wherein the RF coupler further comprises:
  a first coupled RF transmission line coupled between the first RF transceiver and the first RF antenna;
  a second coupled RF transmission line coupled between the second RF transceiver and the second RF antenna; and
  a third coupled RF transmission line coupled between the third RF transceiver and the third RF antenna.

5. The portable communications device of claim 1, wherein the first RF transceiver is a land mobile radio (LMR) transceiver, the second RF transceiver is a long term evolution (LTE) main transceiver, and the third RF transceiver is an LTE diversity transceiver.

6. The portable communications device of claim 1, wherein the first RF antenna, the second RF antenna, and the third RF antenna receive signals from each of the first RF transceiver, the second RF transceiver, and the third RF transceiver through the first RF coupler, and
  wherein the first RF transceiver, the second RF transceiver, and the third RF transceiver receive signals from each of the first RF antenna, the second RF antenna, and the third RF antenna through the first RF coupler.

7. The portable communications device of claim 1, wherein the phasor shaping networks are configured to alter signal magnitudes and phases of signals passing through the phasor shaping networks.

8. A portable communications device comprising:
  a housing;
  a radio-frequency (RF) antenna system including a first RF antenna, a second RF antenna, and a third RF antenna supported by the housing;
  an RF transceiver system including a first RF transceiver, a second RF transceiver, and a third RF transceiver operating in respective RF bands; and
  an isolator circuit coupled to the RF antenna system and the RF transceiver system and configured to provide RF isolation between the first RF transceiver, the second RF transceiver, and the third RF transceiver, the isolator circuit including
    a first RF coupler realized using coupled RF transmission lines and featuring six RF coupler ports coupled to the first RF antenna, the second RF antenna, the third RF antenna, the first RF transceiver, the second RF transceiver, and the third RF transceiver through respective phasor shaping networks;
    a second RF coupler coupled between (i) the first RF coupler and (ii) the first RF antenna and at least one selected from the group consisting of: the second RF transceiver and the third RF transceiver; and
    a third RF coupler coupled between (i) the first RF coupler and (ii) the first RF transceiver and at least one selected from the group consisting of: the second RF antenna and the third RF antenna.

9. A wireless communication component set for a portable communications device, the component set comprising:
  a radio-frequency (RF) antenna system including a first RF antenna, a second RF antenna, and a third RF antenna configured to be supported on a housing of the portable communications device;
  an RF transceiver system including a first RF transceiver, a second RF transceiver, and a third RF transceiver operating in respective RF bands; and
  an isolator circuit coupled to the RF antenna system and the RF transceiver system and configured to provide RF isolation between the first RF transceiver, the second RF transceiver, and the third RF transceiver, the isolator circuit including
    a first RF coupler realized using coupled RF transmission lines and featuring six RF coupler ports coupled to the first RF antenna, the second RF antenna, the third RF antenna, the first RF transceiver, the second RF transceiver, and the third RF transceiver through respective phasor shaping networks; and
    a second RF coupler coupled between (i) the second RF transceiver and the third RF transceiver; and (ii) the first RF coupler, the second RF coupler configured to provide RF isolation between the first RF transceiver, the second RF transceiver, and the third RF transceiver.

10. The wireless communication component set of claim 9, wherein the respective phasor shaping networks include a first three phasor shaping networks coupled between the first RF coupler and the RF antenna system and a second three phasor shaping networks coupled between the first RF coupler and the RF transceiver system, wherein the first three phasor shaping networks are coupled to the RF antenna system through RF transmission lines.

11. The wireless communication component set of claim 9 further comprising:
  a third RF coupler coupled between (i) the first RF coupler; and (ii) the second RF antenna and the third RF antenna.

12. The wireless communication component set of claim 9, wherein the RF coupler further comprises:
  a first coupled RF transmission line coupled between the first RF transceiver and the first RF antenna;
  a second coupled RF transmission line coupled between the second RF transceiver and the second RF antenna; and
  a third coupled RF transmission line coupled between the third RF transceiver and the third RF antenna.

13. The wireless communication component set of claim 9, wherein the first RF transceiver is a land mobile radio (LMR) transceiver, the second RF transceiver is a long term evolution (LTE) main transceiver, and the third RF transceiver is an LTE diversity transceiver.

14. The wireless communication component set of claim 9, wherein the first RF antenna, the second RF antenna, and the third RF antenna receive signals from each of the first RF transceiver, the second RF transceiver, and the third RF transceiver through the first RF coupler, and
  wherein the first RF transceiver, the second RF transceiver, and the third RF transceiver receive signals from each of the first RF antenna, the second RF antenna, and the third RF antenna through the first RF coupler.

15. The wireless communication component set of claim 9, wherein the phasor shaping networks are configured to alter signal magnitudes and phases of signals passing through the phasor shaping networks.

16. A wireless communication component set for a portable communications device, the component set comprising:
- a radio-frequency (RF) antenna system including a first RF antenna, a second RF antenna, and a third RF antenna configured to be supported on a housing of the portable communications device;
- an RF transceiver system including a first RF transceiver, a second RF transceiver, and a third RF transceiver operating in respective RF bands; and
- an isolator circuit coupled to the RF antenna system and the RF transceiver system and configured to provide RF isolation between the first RF transceiver, the second RF transceiver, and the third RF transceiver, the isolator circuit including
  - a first RF coupler realized using coupled RF transmission lines and featuring six RF coupler ports coupled to the first RF antenna, the second RF antenna, the third RF antenna, the first RF transceiver, the second RF transceiver, and the third RF transceiver through respective phasor shaping networks;
  - a second RF coupler coupled between (i) the first RF coupler and (ii) the first RF antenna and at least one selected from the group consisting of: the second RF transceiver and the third RF transceiver; and
  - a third RF coupler coupled between (i) the first RF coupler and (ii) the first RF transceiver and at least one selected from the group consisting of: the second RF antenna and the third RF antenna.

* * * * *